UNITED STATES PATENT OFFICE.

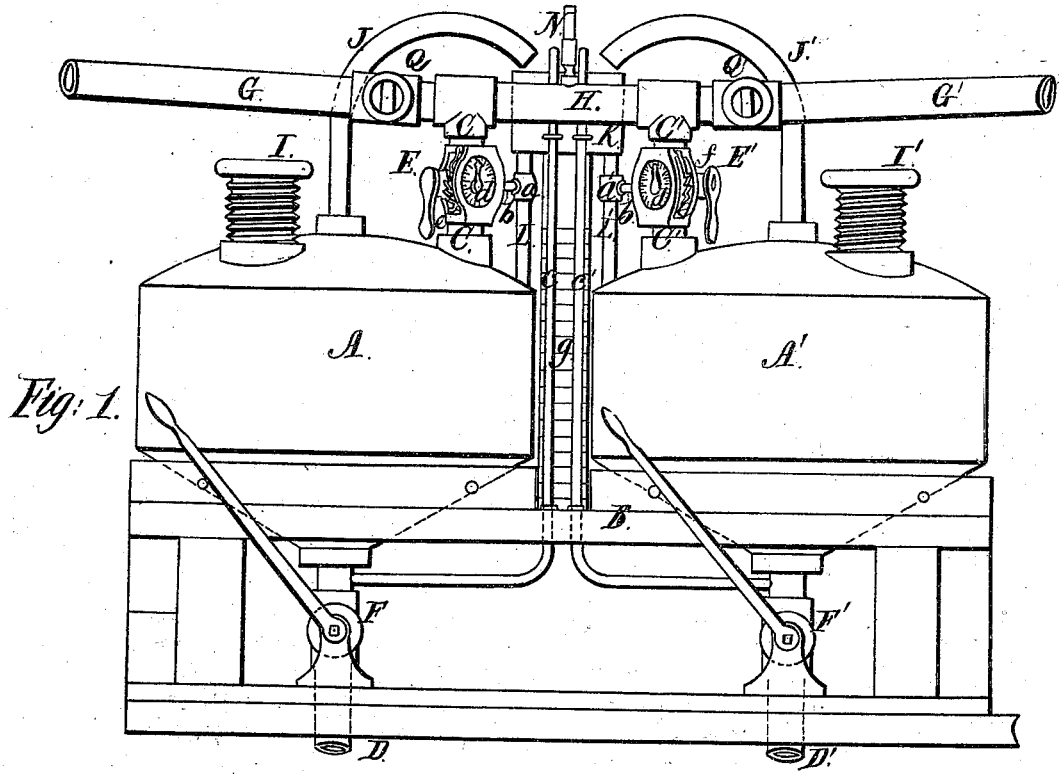
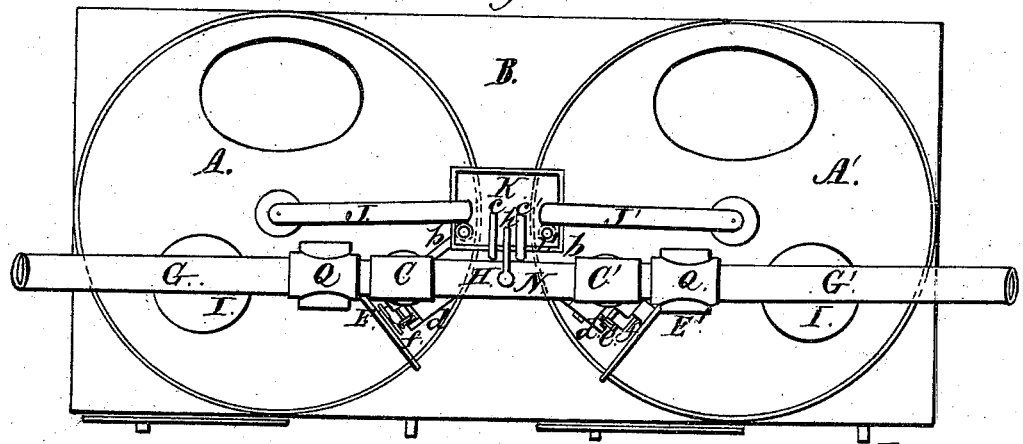

GEORGE W. DEVOE, OF NEW YORK, N. Y.

IMPROVEMENT IN LIQUID-METERS.

Specification forming part of Letters Patent No. 86,823, dated February 9, 1869.

*To all whom it may concern:*

Be it known that I, GEORGE W. DEVOE, of the city, county, and State of New York, have invented a new and Improved Apparatus for Measuring Liquids; and I do hereby declare that the following is a full, clear, and exact description of the same, reference being had to the accompanying drawings, forming part of this specification, in which—

Figure 1 is a front elevation of the apparatus. Fig. 2 is a plan of the same.

Similar letters of reference indicate corresponding parts in the several figures.

This invention is applicable to the measuring of various liquids; but is more especially designed for the measuring of petroleum as it is taken into a tank-scow in which it is to be transported in bulk, in which case the apparatus is placed on the deck of the scow.

The apparatus to which the invention relates is composed of one or more closed measuring-vessels, fitted with suitable means of adjusting their capacity according to variations in the temperature and consequent variations in the relation between the weight and bulk of the liquid to be measured, and furnished with suitable inlet and outlet pipes, vent-pipes, and gage-tubes, and with registering-devices operated by the opening or closing of the cocks in the inlet or outlet pipes to register the number of fillings, and thereby to register the measurement.

The invention consists in certain means, hereinafter specified, whereby great convenience is afforded for effecting a nearly continuous measurement, and extreme accuracy of measurement is insured.

To enable others to make and use my invention, I will proceed to describe it with reference to the drawings, which represent that form and arrangement which I consider best adapted for general use, and especially for the measuring of petroleum as it is received on board of a tank-scow.

A A' are two measuring-vessels of known capacity—say two hundred gallons each—arranged near together, side by side, upon a suitable supporting-frame, B, and when placed on board of a boat or scow arranged one on each side of the midship-line thereof.

I I' are screwed plugs or plungers, screwing into the said vessels, through suitable screwed sockets, and serving to adjust exactly the capacity of the vessels.

C C' are the inlet-pipes, one for each vessel, connected each with the upper parts of its respective vessel; and D D' are the discharge-pipes, one for each vessel, each connected with its respective vessels at the bottom thereof. The inlet-pipes are furnished with cocks E E', provided with suitable handles, and the outlet-pipes are fitted with cocks F F', furnished with suitable levers for opening and closing them. The inlet-pipe C has connected with it a receiving-pipe, G, and the inlet-pipe C' has connected with it a similar pipe, G', and these two receiving-pipes are connected by an intermediate pipe, H. The receiving-pipes G G' are arranged in line with each other in such directions as to provide for their receiving the liquid from opposite sides of the apparatus, as may be desirable, and each has a slight inclination downward toward its respective inlet-pipes C or C', and each is fitted with a cock, Q or Q'.

J J' are the vent-pipes, arranged each on the highest part of its respective measuring-vessel, and bending in a goose-neck form over an open drip-pan, K, which is arranged over and between the two measuring-vessels in such manner that any liquid that may accidentally overflow through them or may be carried up by splashing or other means may fall thereinto. From the bottom of this drip-pan two pipes, L L', lead directly to the measuring-vessels, one to each vessel, and these pipes are furnished with cocks $a$ $a'$, one in each, and each of the said cocks has its plug connected by an intermediate spindle, $b$, with the plug of the inlet-cock E or E' of the same measuring-vessel, so as to be opened or closed by the act of opening the said inlet-cock.

Connected with the lower parts of the measuring-vessels are two transparent gage-tubes, $c$ $c'$, one for each, arranged in front of a graduated scale, $g$, and the upper parts of these tubes are bent over the drip-pan K to discharge any accidental overflow thereto. There is also an open stand-pipe, N, attached to the intermediate pipe, H, for the reception of a hydrometer and thermometer, and to this stand-pipe is attached a small goose-neck pipe, the mouth of which is situated over the drip-pan.

Attached to the shell of each of the inlet-clocks E E' there is a dial, *d*, fitted with an index, to the axle of which is secured a ratchet-wheel, *e*, so arranged that one of its teeth may be acted upon every time its respective cock is closed by means of a spring-pawl, *f*, attached to the plug of the cock in such manner as to turn it a distance sufficient to move the index over one of the graduated and numbered spaces on the dial, the elasticity of the said pawl enabling it to pass over the next tooth of the ratchet-wheel when the cock is closed. Each ratchet-wheel is also furnished with a stop-pawl to prevent it from being turned backward by the spring-pawl.

I will now describe the operation of the apparatus.

The capacity of the measuring-vessels is first adjusted by screwing in or out the plugs or plungers I I', according to the temperature of the atmosphere and of the liquid to be measured. In this way the expansion and contraction of the measuring-vessels, as well as of the liquid to be measured, is compensated for and an accurate measurement approximating to what would be obtained by weighing is provided for. This adjustment may be facilitated by a scale marked on the plugs, plungers, and a point or line on the sockets which receive them. The cock Q or Q' in one of the receiving-pipes G G' is then opened and the corresponding cock in the other receiving-pipe closed, according to which of said pipes is most conveniently situated for receiving the liquid to be measured—as, for instance, in the case of the measuring apparatus being on board of a tank-scow, the cock in the pipe which is nearest the dock whence the liquid is to be received is opened, and that in the other pipe closed. The indexes of the dial are then set at zero, and the measuring may be commenced in either of the vesssels A A'; but I will suppose, for example, that the liquid be received through the pipe G and first measured in the vessel A'. The receiving-cock Q and the inlet-cock E' are in that case opened, and the receiving-cock Q' and inlet-cock E closed, and the outlet-cocks F' and F are both closed. The liquid, which is then received through the pipe G, either from a tank or from barrels emptied into a funnel attached to said pipe, runs through the said pipe and through the intermediate pipe, H, and inlet-pipe C' into the vessel A', the rise of the liquid in which is indicated in the transparent gage-tube *c'* to an attendant who stands in front of the apparatus, and who, when the liquid has risen in the said tube to the point in the graduated scale *g* which indicates the filling of the vessel A' with the quantity to be measured, quickly closes the cock E' with one hand, and at the same time, or instantly afterward, opens the cock E with the other hand, when the liquid commences running into the vessel A, to be measured therein in the same way. He then opens the outlet-cock D' and allows the vessel A' to empty itself while that A is filling.

It may be here observed that the outlet-pipes should be somewhat larger than the inlet-pipes, that the emptying of one vessel may be performed quicker than the filling of its fellow, and the outlet-cock of each may be closed before the other vessel is quite full, and the operation of measuring be performed in one and the other vessel alternately without any intermission of the operation. Any liquid that may have passed over into the drip-pan K through the vent-pipe or gage-tubes in filling one measuring-vessel, and that may not at once run back into the vessel through its pipe L or L', is retained in the said pan until the filling of the other vessel commences, when it is allowed to run into the latter by the opening of the cock *a* or *a'* at the same time that the inlet-cock E or E' of the latter is opened, and hence the oil overflowing into the drip-pan is all measured. As every closing movement of the inlet-cock of each vessel after it has been filled operates the index of the dial of that vessel, the number of times the vessel is filled is accurately registered. If of the whole quantity of liquid to be measured at any time the last portion is insufficient to fill one of the measuring-vessels, it will be measured by the graduated transparent gage-tube.

What I claim as my invention, and desire to secure by Letters Patent, is—

1. The combination of the two measuring-vessels A A', inlet-pipes C C', inlet-cocks E E', receiving-pipes G G', receiving-cocks Q Q', and intermediate pipe, H, substantially as herein described, whereby provision is made for filling both measuring-vessels from either side of the measuring apparatus.

2. The drip-pan K, connected with the measuring-vessels by pipes L L', fitted with cocks *a a'*, which are opened and closed by the act of opening and closing the cocks of the inlet-pipes of their respective vessels, substantially as and for the purpose herein specified.

3. The vent-pipes and gage-tubes arranged with respect to the vessels A A and drip-pan K, substantially as and for the purpose herein specified.

GEO. W. DEVOE.

Witnesses:
GEO. W. BETTS,
J. SEAVER PAGE.